(12) United States Patent
Schuster

(10) Patent No.: US 6,354,097 B1
(45) Date of Patent: *Mar. 12, 2002

(54) METHOD AND APPARATUS FOR LIMITING REFRIGERANT PRESSURE IN HEATING MODE

(75) Inventor: Don Alan Schuster, Martinsville, IN (US)

(73) Assignee: Carrier Corporation Carrier World Hdqrts., Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/598,542

(22) Filed: Jun. 21, 2000

Related U.S. Application Data

(63) Continuation-in-part of application No. 08/995,624, filed on Dec. 22, 1997, now Pat. No. 6,092,378.

(51) Int. Cl.[7] ............................. F25D 17/04; F25B 1/00
(52) U.S. Cl. ...................... 62/186; 62/498; 62/DIG. 17
(58) Field of Search .......................... 62/181, 184, 186, 62/498, DIG. 17

(56) References Cited

U.S. PATENT DOCUMENTS 3,004,402 A * 10/1961 Dart et al. ................. 62/184 X
6,092,378 A *  7/2000 Das et al. ...................... 62/186

* cited by examiner

Primary Examiner—William Wayner
(74) Attorney, Agent, or Firm—Wall Marjama & Bilinski LLP

(57) ABSTRACT

A heat pump system includes an outdoor unit, an indoor unit, a compressor, and outdoor and indoor fans. An outdoor heat exchanger coil is connected to an indoor heat exchanger coil by liquid and vapor tubes. A control system limits the pressure in the vapor tubes during heating mode periods of heat pump operation by using a temperature sensor including a switch operatively connected in the indoor heat exchanger coil for sensing a temperature in the indoor heat exchanger coil. The switch operatively connects in series with a motor of the outdoor fan, such that when the temperature sensor senses a predetermined temperature in the indoor heat exchanger coil, it causes the switch to reduce a speed of the outdoor fan, thereby reducing the temperature in the vapor tubes and indoor heat exchanger coil.

13 Claims, 1 Drawing Sheet

METHOD AND APPARATUS FOR LIMITING REFRIGERANT PRESSURE IN HEATING MODE

CROSS-REFERENCE TO RELATED APPLICATIONS

This invention is a continuation in part of U.S. aplication Ser. No. 08/995,624 filed Dec. 22, 1997, now U.S. Pat. No. 6,092,378 and entitled VAPOR LINE PRESS CONTROL, incorporated herein by reference.

FIELD OF THE INVENTION

This invention relates generally to heat pump systems, and in particular, to a method and apparatus for controlling the pressure within the interconnecting tubing and other refrigerant containing components thereof to prevent the maximum design pressure from being exceeded when using a high pressure refrigerant.

BACKGROUND OF THE INVENTION

The refrigerant which has been commonly used in conventional residential and commercial air conditioners and heat pumps has been R-22, an HCFC refrigerant. However, because of the recent concern about environmental effects, CFC and HCFC refrigerants are being phased out. The non-chlorinated refrigerants which are being developed as replacements in the residential and light commercial systems tend to be of higher pressure than the R-22 refrigerant. One of the more promising replacement refrigerants is HFC R-410A, with operating pressures up to 70% higher than R-22.

Use of higher pressure refrigerants has the greatest impact on the high pressure side of a system. Accordingly, for an air conditioner, the outdoor unit needs to be substantially changed in design in order to accommodate these higher pressures. That is, to meet the requirements of safety agencies and organizations, most refrigerant containing components on the high pressure side of the system must be designed to withstand the significantly higher pressures. Existing low pressure side components, on the other hand, may be used with only minor modifications and/or precautions. The costs associated with these changes of both the outdoor and indoor sections of an air conditioner to accommodate an R-410A refrigerant is not significantly higher than that for replacing an R-22 air conditioner with a new R-22 air conditioner and is therefore economically feasible. This is not necessarily so in the case of a heat pump.

To accommodate an R-410A heat pump operating in the cooling mode, the outdoor section must be redesigned to accommodate the higher pressures as discussed above. In addition, to accommodate the heating mode of operation, wherein the high pressure section is in the indoor coil, the indoor refrigerant containing components, as well as other components in the outdoor unit, must be redesigned.

In addition to the outdoor and indoor coils, there is a portion of the system known as the "line set" which is the interconnecting tubing connecting the indoor and outdoor sections of air conditioners and heat pumps. Typically, R-22 air conditioners and heat pumps have used what is referred to as RST (Refrigerant Service Tube ) refrigeration copper tubing for line sets. The physical dimensions of RST tubing is not regulated or recognized by any safety organization or set by national standards but is simply the general air conditioning and refrigerant industry accepted tubing.

The line set is typically considered to be field fabricated and is generally regulated by local building codes. Most local and national codes for refrigerant piping reference the ASME standard, ASME B31.5 "Refrigeration Piping." For R-410A air conditioners and R-410A heat pumps operating in the cooling mode, the standard RST tubing meets the requirements set forth in the ASME B31.5 standard. However, with heat pumps, the conventional R-22 construction of the line set vapor line typically does not meet the requirement of the ASME B31.5 standard. That is, a standard RST vapor tube installed in a heat pump has a rated working pressure below that of the ASME B31.5 standard when using R-410A as a refrigerant.

One approach to accommodating the R-410A refrigerant is to change the line sets or at least the vapor line. However, this causes disproportionate costs to be incurred. First of all, the line sets of existing systems are often located in the walls between the outdoor and indoor systems and cannot be easily accessed. Second, apart from the labor costs, the cost of copper tubing is expensive because (a) thicker walls require more copper, and (b) the low volume of thicker walled copper tubes drives costs up disproportionately. For these reasons, the required changes that need to be made to an R-22 heat pump to accommodate the use of R-410A are significantly higher than the cost to replace the R-22 system with a new R-410A system, so retrofitting is therefore not economically feasible.

SUMMARY OF THE INVENTION

Briefly stated, a heat pump system includes an outdoor unit, an indoor unit, a compressor, and outdoor and indoor fans. An outdoor heat exchanger coil is connected to an indoor heat exchanger coil by liquid and vapor tubes. A control system limits the pressure in the vapor tubes during heating mode periods of heat pump operation by using a temperature sensor including a switch operatively connected in the indoor heat exchanger coil for sensing a temperature in the indoor heat exchanger coil. The switch operatively connects in series with a motor of the outdoor fan, such that when the temperature sensor senses a predetermined temperature in the indoor heat exchanger coil, it causes the switch to reduce a speed of the outdoor fan, thereby reducing the temperature in the vapor tubes and indoor heat exchanger coil.

According to an embodiment of the invention, a heat pump system includes a compressor, an outdoor fan and an indoor fan, an outdoor coil and an indoor coil interconnected by liquid and vapor lines, and a reversing valve operable selectively to direct refrigerant flow for either cooling or heating modes of operation, and a control system for allowing a replacement refrigerant having a substantially higher pressure than an original refrigerant for which the system was designed, without replacement of any lines in the indoor coil or the vapor line. The heat pump system includes temperature sensing means for sensing when a temperature in the vapor lines exceeds a predetermined temperature limit during periods of operation in the heating mode; and speed reducing means for responsively reducing a speed of the outdoor fan thereby to lower the temperature to an acceptable limit below the predetermined temperature limit.

According to an embodiment of the invention, a heat pump system includes an outdoor unit with a compressor, an outdoor fan, an outdoor heat exchanger coil, an indoor heat exchanger coil connected thereto by liquid and vapor tubes, and a control system for limiting the pressure in the vapor line during periods of heat pump operation. The system includes a temperature sensor including a switch operatively connected in the indoor heat exchanger coil for sensing a temperature in the indoor heat exchanger coil; the switch being operatively connected in series with a motor of the outdoor fan; wherein when the temperature sensor senses a predetermined temperature in the indoor heat exchanger coil and causes the switch to reduce a speed of the outdoor fan, thereby reducing a temperature in the indoor heat exchanger coil.

According to an embodiment of the invention, in a heat pump of the type having a compressor, an outdoor fan, an indoor fan, an outdoor coil and an indoor coil interconnected by respective liquid and vapor interconnecting tubes, wherein a pressure in at least one of the tubes is susceptible to exceeding a predetermined maximum operating pressure during periods of operation in a heating mode, a method of controlling the pressure in the tubes includes the steps of (a) sensing a temperature in the indoor coil; comparing the sensed temperature with a predetermined maximum threshold temperature which is below a predetermined maximum temperature corresponding to the maximum design pressure; and (b) reducing a speed of the outdoor fan when the sensed temperature is equal to the maximum temperature.

DETAILED DESCRIPTION OF THE PREFERRED EMBODIMENT

Figure 1:
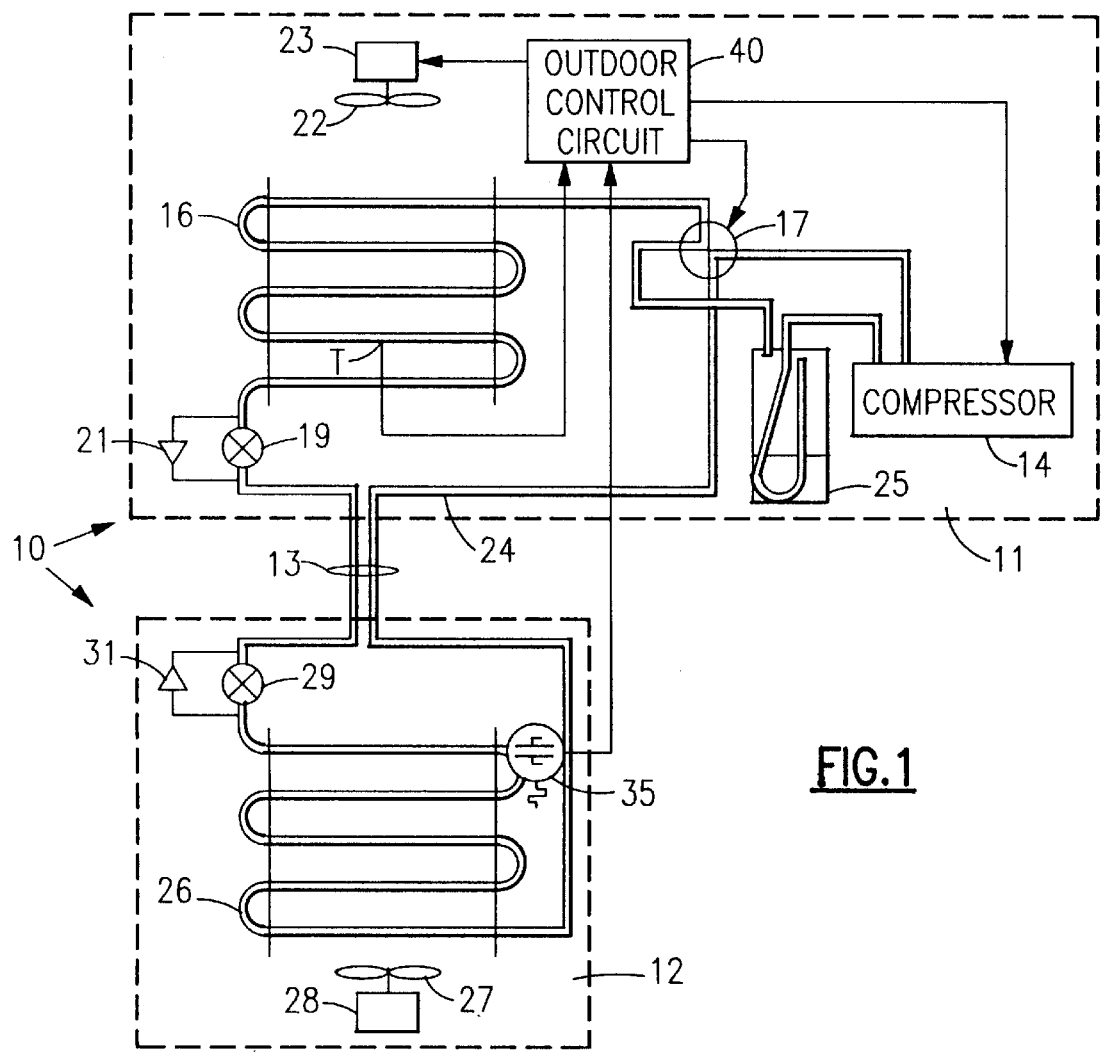
FIG. 1 shows a schematic diagram of a heat pump system incorporating an embodiment of the present invention.

Referring now to FIG. 1, a heat pump system 10 includes an outdoor unit 11 and an indoor unit 12 interconnected by tubing commonly referred to as a line set 13. Outdoor unit 11 includes a compressor 14 and a heat exchanger coil 16 which operate in a conventional manner in cooperation with indoor unit 12 to bring about a complete refrigeration cycle while operating in either the heating or cooling mode. That is, outdoor coil 16 acts as a condenser coil whereby the system is operating in the cooling mode and as an evaporator during periods when the system is operating in the heating mode. A four way valve 17 included in outdoor section 11 switches between the heating and cooling modes in a conventional manner. An expansion device 19 is used during heat pump modes of operation, with a bypass line 21 acting to bypass expansion device 19 during periods of air conditioning modes of operation. An accumulator 25 at the evaporator outlet prevents liquid refrigerant from returning to compressor 14. An outdoor fan 22 and motor 23 circulate outdoor air over outdoor coil 16 in a conventional manner, except as modified by the present invention.

Indoor unit 12 includes an indoor heat exchanger coil 26 with an indoor fan 27 and fan motor 28 for circulating indoor air over coil 26. An expansion device 29, with a bypass portion 31, is included to accommodate the cooling and heating modes in a conventional manner. A normally closed temperature sensor 35 is located inside coil 26, preferably at a bend of the coil. Temperature sensor 35 must be located where the refrigerant inside coil 26 is two-phase.

Figure 2:
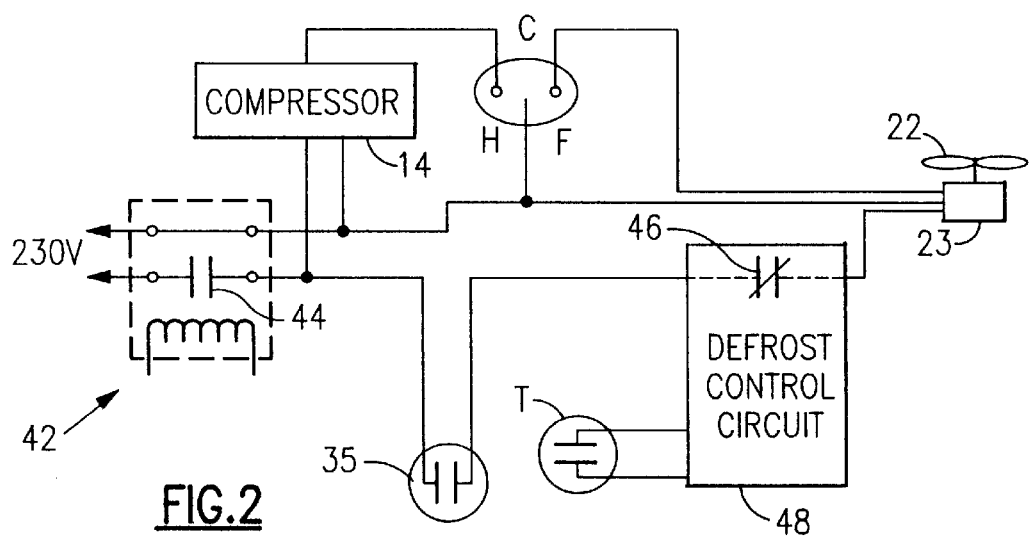
FIG. 2 shows a portion of the electrical circuitry of the heat pump system of FIG. 1 incorporating a temperature sensor according to an embodiment of the present invention.

Referring also to FIG. 2, a portion of the electrical circuitry of the present invention is shown, and in particular, the interconnection between compressor 14, outdoor fan motor 23, and temperature sensor 35. Compressor 14 is connected to a high voltage power source by way of a contactor 42 which is controlled to turn the compressor on and off via a switch 44 in accordance with normal operating control functions. Fan motor 23 for outdoor fan 22 is connected in a circuit in parallel with compressor 14 so as also to be powered through contactor 42. Temperature sensor 35 is in the circuit between fan motor 23 and contactor 42. Also shown here is a defrost control circuit 48, including a normally closed switch 46, which is controlled by a thermostat T. Temperature sensor 35 is activated by the temperature increase within indoor heat exchanger coil 26. Since the temperature is directly related to the pressure, when the pressure in the coil exceeds a cut-off temperature of temperature sensor 35 and opens the electrical contacts, thus turning outdoor fan 22 off. Without the air flow across the outdoor coil, heat exchanger coil 16, (the evaporator during heating mode of operation), the saturated suction pressure of the evaporator drops and so does the pressure and specific volume of the refrigerant entering the compressor. This in turn reduces volumetric efficiency of the compressor and the refrigerant discharge pressure. This pressure decrease continues until the cut-on temperature of temperature sensor 35 is reached, at which time the switch inside temperature sensor closes and power resumes to outdoor fan 22.

Considering now the changes that must be made to such a system designed for use with a relatively low pressure refrigerant such as R-22 when that refrigerant is replaced with a relatively high pressure refrigerant such as R-410A, it is desirable to make changes in various components of both outdoor unit 11 and indoor unit 12. For example, since the pressures in the outdoor unit can reach 600 Psig while operating in the cooling mode, the entire outdoor unit is replaced. In the indoor unit, however, only the expansion device needs to be replaced, so the indoor coil can be retained. Although the above changes can be made in a generally economically feasible manner, there are other changes which, though desirable, are not economically feasible. That is, since during heat pump modes of operation the high pressure side would normally operate at relatively high pressures that could exceed the maximum design pressure of the interconnecting tubing, it would be desirable to have thicker walled tubing in both the high pressure side of the line set and in the indoor coil 26. However, it would be expensive to replace the entire indoor coil 26, and to replace line set 13 may be either moderately expensive or prohibitively expensive if structural changes to the building are required. The present invention is therefore provided to accommodate the need in a reliable and economical manner.

The principal of operation of the present invention is to reduce the speed of the outdoor fan motor 22 when the vapor line refrigerant pressure of the heat pump system operating in the heating mode reaches the design pressure of the line set or the indoor coil. This in turn causes the refrigerant pressure on the high side of the system to be reduced. When the reduction of the refrigerant pressure in the vapor line reaches a predetermined cut in pressure, thereby causing a decrease in the temperature in indoor coil 26, the original fan motor speed is resumed. The pressure (temperature) at which the fan motor speed is reduced is set by the lowest design pressure for the specific combination of vapor line and indoor coil. The cut in pressure is driven by the differential of economically feasible switches. A reduction in the fan motor speed may be accomplished in any of a number of ways. For example, a two-speed motor can be used wherein high speed is used during normal operation and low speed is used during periods in which the cut-out pressure (cut-off temperature) has been reached. A typical motor which could be used for this purpose is an induction type motor with single or multiple speeds which is commercially available from motor manufacturers such as General Electric, A. O. Smith, or Emerson.

Another alternative is to use a variable speed motor for the outdoor fan. Because of the higher costs of such a motor, it would not be economically feasible to use it only for this purpose. However, if there are other reasons to have a variable speed motor to drive the outdoor fan, such as a possible savings in long term operating costs, then a variable speed motor is practical for this use. In such case, the motor is operated at higher speeds for normal operation and is then operated at lower speeds or stopped at times when the pressure cut-out (temperature cut-off) limit has been reached.

For purposes of simplicity, the present invention is described in terms of use with a single speed motor which is operated in either the on or off condition. That is, it is turned on during periods of normal operation and turned off when the cut out pressure (cut-off temperature) is reached as sensed by temperature sensor 35. An example of such a motor that could be used for this purpose is General Electric Part Number KCP39FGN809BS.

Referring now to the following Table I, the RST copper tube dimensions for various sized heat pump systems are shown, along with the corresponding ASME maximum working pressures and their associated temperatures. In this regard, it should be understood that this working pressure is established with a substantial margin of safety applied. For example, a typical R-22 indoor coil design with an actual burst pressure of 2100 Psig has a working pressure limit of 420 Psig (i.e., with a safety factor of 5). Thus, the ASME maximum working pressures listed in Table I are also calculated with a similar safety margin.

TABLE I

| System Tube Capacity (ton) | Tube Outside Thickness (in.) | Tube Thickness | ASME Max. Working Pressure (Psig) | ASME Max. Working Temp. (° F.) | Temp. Switch (° F.) Cut-On | Temp. Switch (° F.) Cut-Off |
|---|---|---|---|---|---|---|
| 2 | ⅝ | .0030 | 472 | 129 | 102 | 117 |
| 2.5–3 | ¾ | .0035 | 384 | 114 | 98 | 114 |
| 3.5–4 | ⅞ | .0040 | 430 | 122 | 102 | 117 |
| 4–5 | 1⅛ | .0040 | 374 | 112 | 96 | 112 |

Considering now that a typical heat pump system with a capacity in the 2–5 ton range will have a maximum operating pressure in its vapor line of 460–520 Psig (127–137° F.), it will be recognized that the ASME maximum working pressure (temperature) will be exceeded unless a solution such as the present invention is applied to limit the pressure.

Referring now to the last two columns of Table I, the temperature switch cut-on and cut-off temperatures are provided for each of the systems of the capacities listed. For example, in a two ton system, wherein the ASME working pressure is 472 Psig (129° F.), temperature sensor 35 cuts off (i.e., it opens to turn off fan motor 23) at 117° F. and remains open until the temperature drops to 102° F., at which time it closes and resumes operation.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A heat pump system having a compressor, an outdoor fan and an indoor fan, an outdoor coil and an indoor coil interconnected by liquid and vapor lines, and a reversing valve operable selectively to direct refrigerant flow for either cooling or heating modes of operation, and a control system for allowing a replacement refrigerant having a substantially higher pressure than an original refrigerant for which the system was designed, without replacement of any lines in the indoor coil or the vapor line, said heat pump system comprising:
   temperature sensing means for sensing when a temperature in said vapor lines exceeds a predetermined temperature limit during periods of operation in said heating mode; and
   speed reducing means for responsively reducing a speed of said outdoor fan thereby to lower said temperature to an acceptable limit below said predetermined temperature limit.

2. A heat pump system as set forth in claim 1 wherein said temperature sensing means is a temperature sensor located in said indoor coil.

3. A heat pump system as set forth in claim 2 wherein said temperature sensor includes a normally closed switch in series with a drive motor of said outdoor fan.

4. A heat pump system as set forth in claim 3 wherein said switch opens at a first predetermined temperature and closes at a second predetermined temperature below that of said first predetermined temperature.

5. A heat pump system as set forth in claim 1 wherein said speed reducing means is a switch that turns off the outdoor fan.

6. A heat pump system having an outdoor unit with a compressor, an outdoor fan, an outdoor heat exchanger coil, an indoor heat exchanger coil connected thereto by liquid and vapor tubes, and a control system for limiting the pressure in said vapor line during periods of heat pump operation, the system comprising:
   a temperature sensor including a switch operatively connected in said indoor heat exchanger coil for sensing a temperature in said indoor heat exchanger coil;
   said switch operatively connected in series with a motor of said outdoor fan;
   wherein when said temperature sensor senses a predetermined temperature in said indoor heat exchanger coil and causes said switch to reduce a speed of said outdoor fan, thereby reducing a temperature in said indoor heat exchanger coil.

7. A heat pump as set forth in claim 6 wherein said switch is a normally closed switch.

8. A heat pump as set forth in claim 7 wherein said switch opens at a first predetermined temperature and closes at a second predetermined temperature below that of said first predetermined temperature.

9. A heat pump system as set forth in claim 6 wherein said switch turns off said outdoor fan.

10. In a heat pump of the type having a compressor, an outdoor fan, an indoor fan, an outdoor coil and an indoor coil interconnected by respective liquid and vapor interconnecting tubes, wherein a pressure in at least one of said tubes is susceptible to exceeding a predetermined maximum operating pressure during periods of operation in a heating mode, a method of controlling the pressure in said tubes comprising the steps of:

sensing a temperature in said indoor coil; comparing said sensed temperature with a predetermined maximum threshold temperature which is below a predetermined maximum temperature corresponding to said maximum design pressure; and reducing a speed of said outdoor fan when said sensed temperature is equal to said maximum temperature.

11. A method as set forth in claim 10, further comprising the step of increasing said speed of said outdoor fan when said sensed temperature is reduced to a minimum temperature.

12. A method as set forth in claim 10 wherein the step of reducing the speed of the outdoor fan is accomplished by turning off electrical power to said outdoor fan.

13. A method as set forth in claim 11 wherein said step of increasing the speed of said outdoor fan is accomplished by resuming electrical power to said outdoor fan.

* * * * *